(12) United States Patent
Fujikubo et al.

(10) Patent No.: US 7,074,146 B2
(45) Date of Patent: *Jul. 11, 2006

(54) CHAIN TENSIONER

(75) Inventors: Makoto Fujikubo, Saitama (JP);
Masashi Furuya, Saitama (JP); Akira Sonobata, Saitama (JP); Hideo Ibukuro, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 10/646,741

(22) Filed: Aug. 25, 2003

(65) Prior Publication Data
US 2004/0132569 A1 Jul. 8, 2004

(30) Foreign Application Priority Data
Sep. 11, 2002 (JP) ............................. 2002-266035

(51) Int. Cl.
*F16H 7/08* (2006.01)
(52) U.S. Cl. ................................................ 474/111
(58) Field of Classification Search ............ 474/101, 474/111, 140
See application file for complete search history.

(56) References Cited

U.S. PATENT DOCUMENTS
5,653,652 A * 8/1997 Simpson .................... 474/110

FOREIGN PATENT DOCUMENTS
JP 63-29963 Y2 8/1988
JP 2001-355690 A 12/2001

* cited by examiner

*Primary Examiner*—Vicky A. Johnson
(74) *Attorney, Agent, or Firm*—Birch, Stewart, Kolasch & Birch, LLP

(57) ABSTRACT

To reduce a load of a tensioner lifter, enhancing the oscillation absorption function of the tensioner lifter in a chain tensioner. In a chain tensioner provided with a tensioner arm rockably supported by fixed structure and relatively slidably engaged with the outside on the loose side of a transmission chain without an end coupling a driving sprocket and a driven sprocket and a tensioner lifter supported by the fixed structure for pressing the tensioner arm on the side of the transmission chain, a control arm is rockably supported by the fixed structure for transmitting the pressure of the tensioner lifter to the tensioner arm. The control arm is inserted between the tensioner arm and the tensioner lifter.

22 Claims, 8 Drawing Sheets

CHAIN TENSIONER

CROSS-REFERENCE TO RELATED APPLICATIONS

The present application claims priority under 35 USC 119 to Japanese Patent Application Nos. 2002-266035 filed on Sep. 11, 2002 the entire contents thereof are hereby incorporated by reference.

BACKGROUND OF THE INVENITON

1. Field of the Invention

The present invention relates to the improvement of a chain tensioner provided with a tensioner arm rockably supported by fixed structure and slidably engaged with the outside on the loose side of a transmission chain without an end coupling a driving sprocket and a driven sprocket and a tensioner lifter supported by fixed structure for pressing the tensioner arm upon the side of the transmission chain.

2. Description of Background Art

Such a chain tensioner is already known as disclosed in Japanese published examined patent application No. Sho63-29963, for example.

In a conventional type chain tensioner, a tensioner lifter directly presses the back of a tensioner arm. To facilitate the absorption of the oscillation of a transmission chain, it is desirable that the flexibility of the tensioner arm is enhanced and its oscillation absorption function is enhanced. However, in the conventional type of tensioner lifter is directly oscillated by the tensioner arm, a load of the tensioner lifter is increased and the follow-up of the tensioner lifter for the transmission chain may be deteriorated.

SUMMARY AND OBJECTS OF THE INVENTION

The present invention is made in view of such a situation. It is an object of the present invention to provide a chain tensioner in which a load of a tensioner lifter is reduced, enhancing the oscillation absorption function of the tensioner lifter and the follow-up of the tensioner lifter for a transmission chain so that it may be satisfactorily maintained.

To achieve this object, the present invention is based upon a chain tensioner provided with a tensioner arm rockably supported by fixed structure and slidably engaged with the outside on the loose side of a transmission chain without an end coupling a driving sprocket and a driven sprocket and a tensioner lifter supported by the fixed structure for pressing the tensioner arm upon the side of the transmission chain. A control arm is rockably supported by the fixed structure for transmitting the pressure of the tensioner lifter to the tensioner arm that is inserted between the tensioner arm and the tensioner lifter.

The fixed structure corresponds to an engine body Ea in embodiments described later of the invention.

According to the first embodiment, the oscillation of the transmission chain can be absorbed by applying suitable flexibility to the tensioner arm. In addition, as the control arm is inserted between the tensioner arm and the tensioner lifter, the repulsion of the transmission chain for the tensioner arm is transmitted to the tensioner lifter after the repulsion is buffered by the suitable flexibility of the control arm and a load of the tensioner lifter can be reduced. Therefore, the follow-up of the transmission chain by the tensioner lifter can be satisfactorily performed, securing the desired useful life of the tensioner lifter.

In addition to the first embodiment, the present invention provides that a point of the application of the pressure of the tensioner lifter upon the control arm is set to the middle of the center of the oscillation of the control arm and a point at which the control arm presses the tensioner arm.

According to the second embodiment, the tensioner arm can be greatly moved via the control arm at a relatively small stroke of a lifter rod of the tensioner lifter owing to the arm ratio of the control arm. As a result, the follow-up of the transmission chain by the tensioner lifter is further enhanced. In addition, the repulsion of the transmission chain is not only directly transmitted to the tensioner lifter but the useful life of the tensioner lifter can be extended.

Further, in addition to the first or second embodiments, the present invention includes a pressing part for pressing the outside of the transmission chain so that the pressing part can be slid that is provided to the control arm between the end of the tensioner arm and the sprocket in the vicinity of the end.

The pressing part corresponds to an auxiliary shoe 28 in an embodiment described later of the invention.

According to the third embodiment, the contact ratio of the transmission chain and the driving or driven sprocket in the vicinity of the end of the tensioner arm is enhanced and the present invention can contribute to the enhancement of chain transmission efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
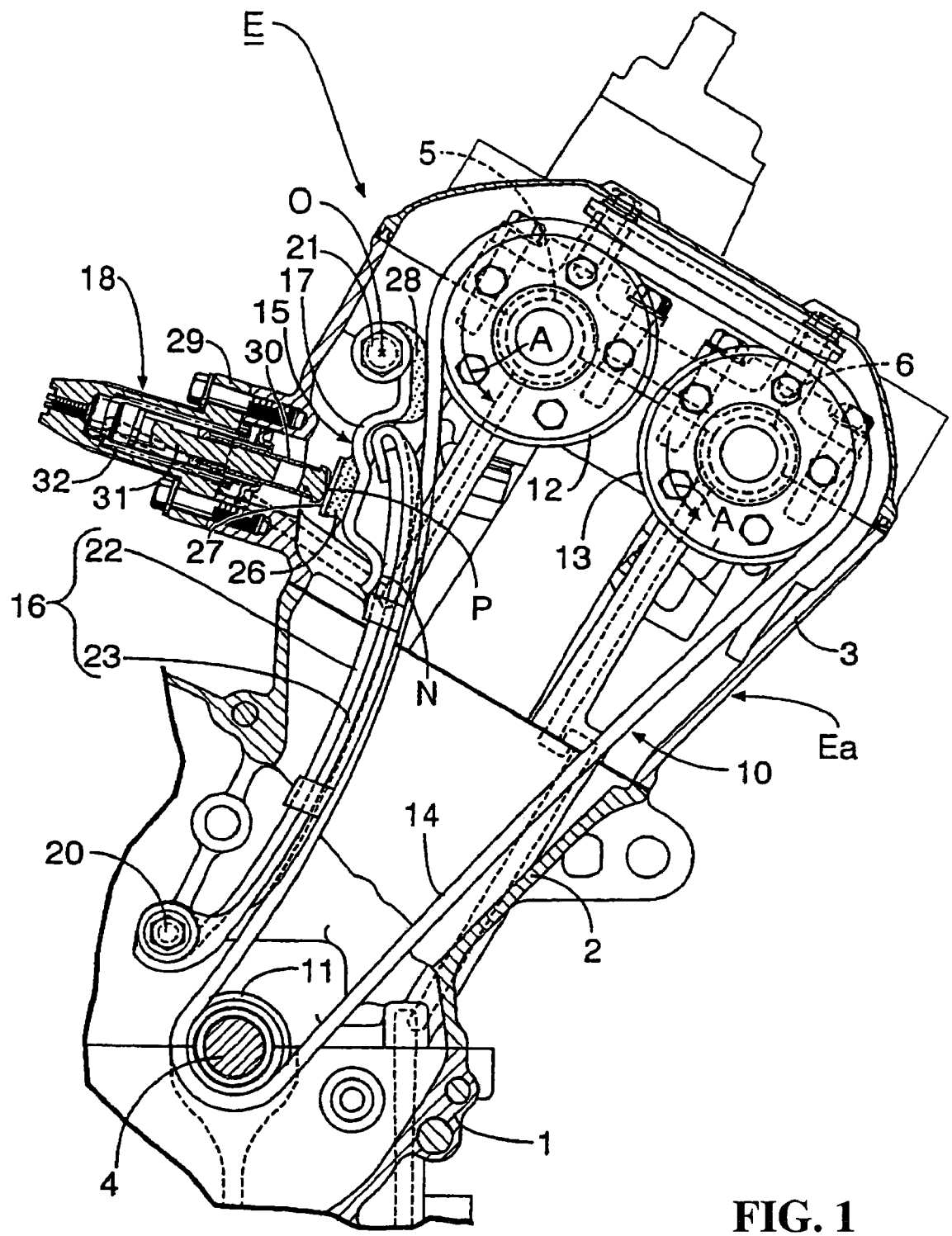
FIG. 1 is a side view showing a timing transmission gear for a valve gear of an engine provided with a chain tensioner according to the invention.
Figure 2:
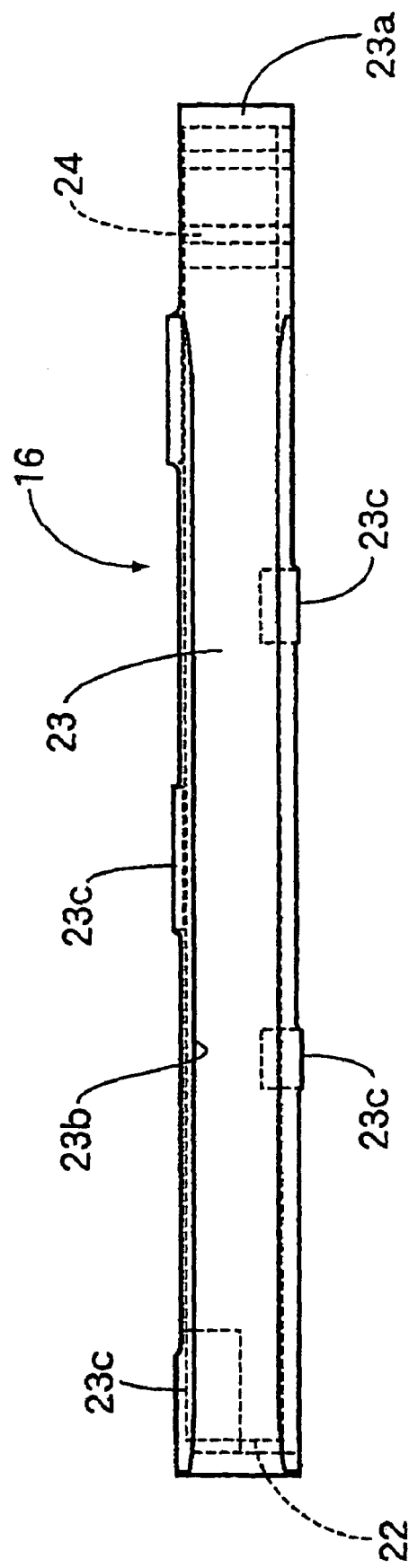
FIG. 2 is a plan showing a tensioner arm of the chain tensioner.
Figure 3:
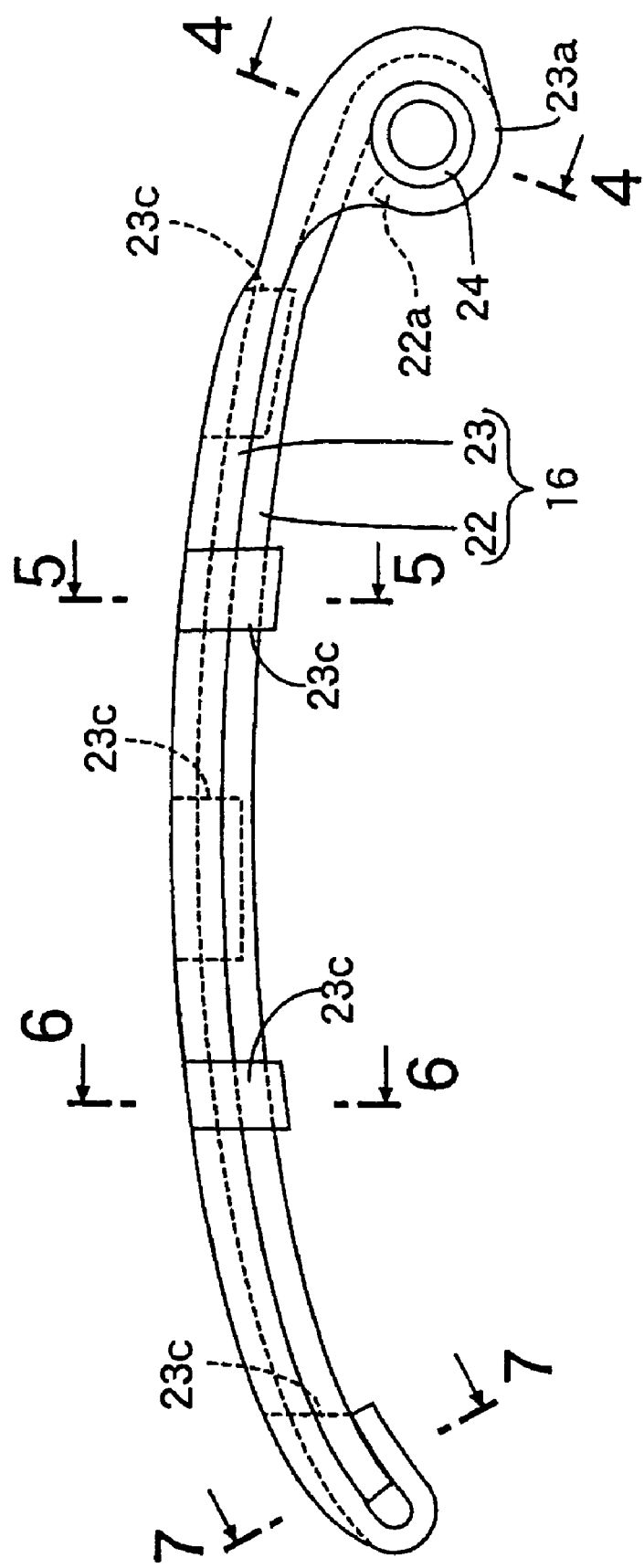
FIG. 3 is a side view showing the tensioner arm.
Figure 4:
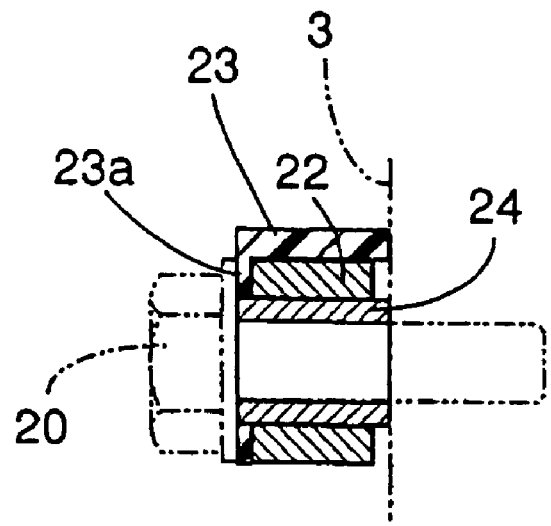
FIG. 4 is a sectional view viewed along a line 4—4 in FIG. 3.
Figure 5:
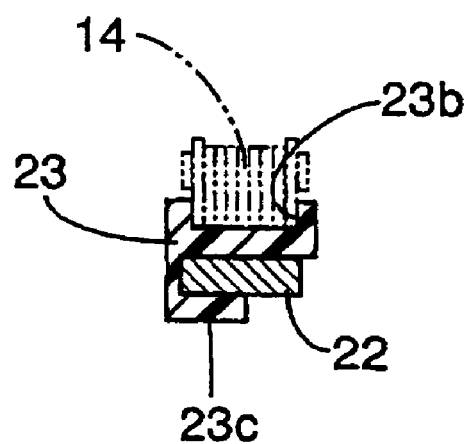
FIG. 5 is a sectional view viewed along a line 5—5 in FIG. 3.
Figure 6:
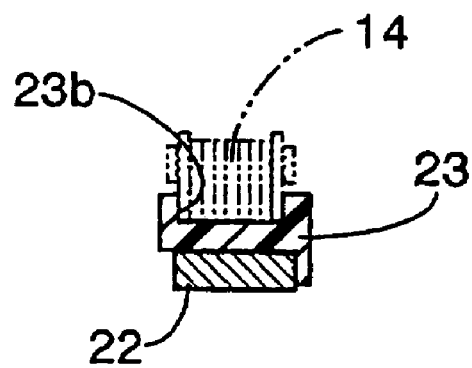
FIG. 6 is a sectional view viewed along a line 6—6 in FIG. 3.
Figure 7:
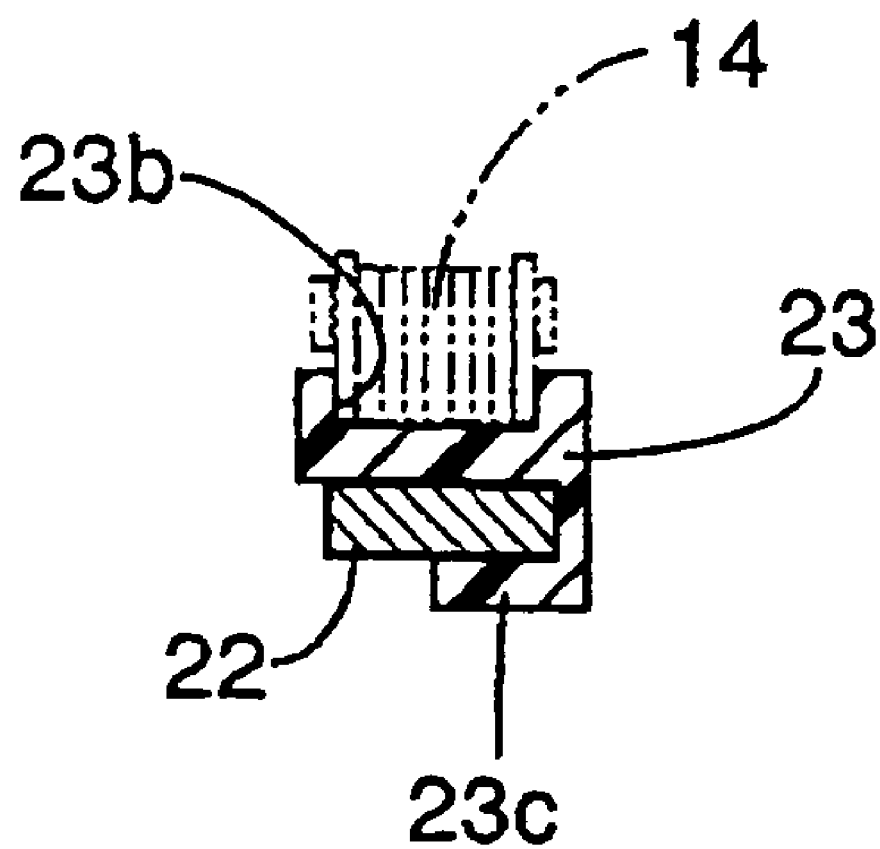
FIG. 7 is a sectional view viewed along a line 7—7 in FIG. 3.

Suitable embodiments of the invention shown in the drawings will be described below.

First, as shown in FIG. 1, an engine E for a motorcycle is arranged in a state in which the head is inclined in front of a vehicle. The body Ea of the engine E is composed of a crankcase 1, a cylinder block 2 and a cylinder head 3, a crankshaft 4 is supported by the crankcase 1, a camshaft for intake air 5 and a camshaft for exhaust 6 are supported by the cylinder head 3, and the crankshaft 4, the camshaft for intake air 5 and the camshaft for exhaust 6 are coupled by a timing transmission gear 10.

The timing transmission gear 10 is composed of a driving sprocket 11 fixed to the crankshaft 4, first and second driven sprockets 12, 13, respectively, are fixed to the camshaft for intake air 5. The camshaft for exhaust 6 and a transmission chain 14, without an end wound on the driving sprocket 11, is fixed to the first and second driven sprockets 12, 13. The first and second driven sprockets 12, 13 both have double teeth corresponding to the number of the teeth of the driving sprocket 11 and are driven in a direction shown by an arrow A at a half reduction ratio from the driving sprocket 11.

On the loose side of the transmission chain 14, a chain tensioner 15 according to the invention for applying fixed tension to it is arranged.

The chain tensioner 15 is composed of a tensioner arm 16, a control arm 17 and a tensioner lifter 18.

As shown in FIGS. 1 to 7, the tensioner arm 16 is composed of a band tensioner arm body 22 rockably supported in the vicinity of the driving sprocket 11 via a first pivot 20 by the cylinder block 2. The tensioner arm 16 is made of a spring steel plate curved toward the outside of the loose side of the transmission chain 14 and a flexible tensioner shoe 23 made of flexible synthetic resin that covers the front of the tensioner arm body 22 and is slidingly engaged with the outside of the loose side of the transmission chain 14. As a whole, suitable flexibility that can absorb the oscillation of the transmission chain 14 is applied. The tensioner arm body 22 and the tensioner shoe 23 are respectively provided with a boss 22a and a boss 23a supported via a collar 24 by the first pivot 20 at each end. A chain guide groove 23b is provided to which the loose side of the transmission chain 14 is fitted so that the loose side that can be slid is formed on the front of the tensioner shoe 23 and at the back of the tensioner shoe. Plural holding claws 23c are formed for holding the tensioner arm body 22 lapped over the tensioner shoe.

Figure 8:
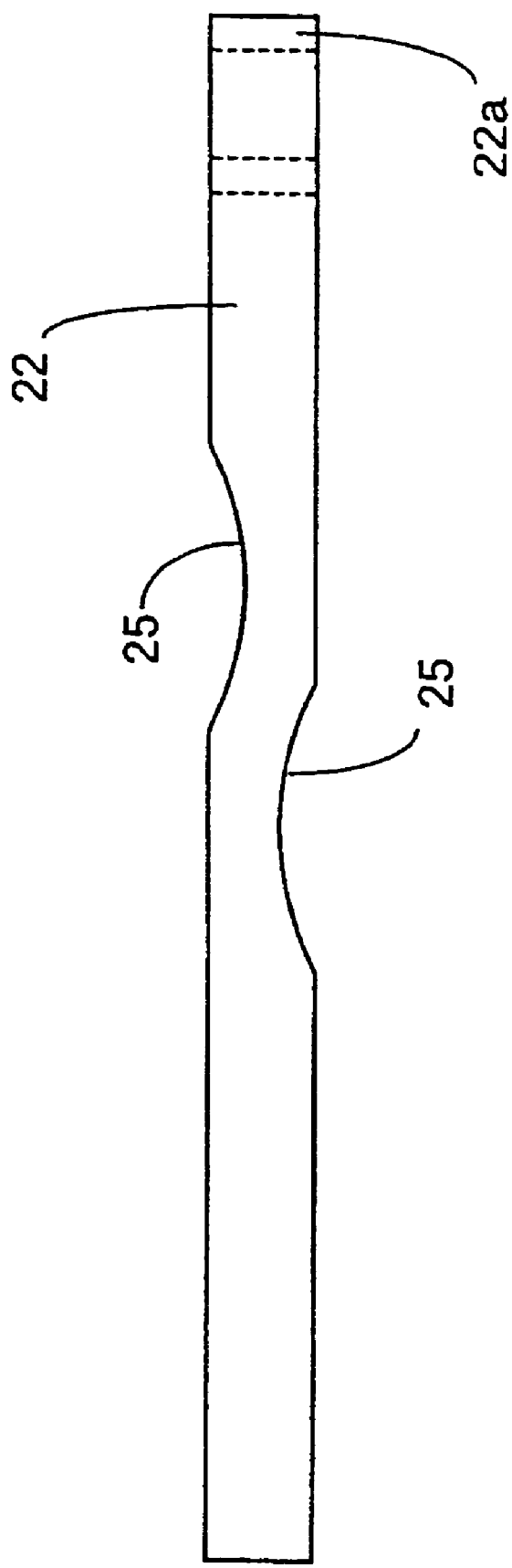
FIG. 8 is a plan showing a tensioner arm body in the tensioner arm.
Figure 9:
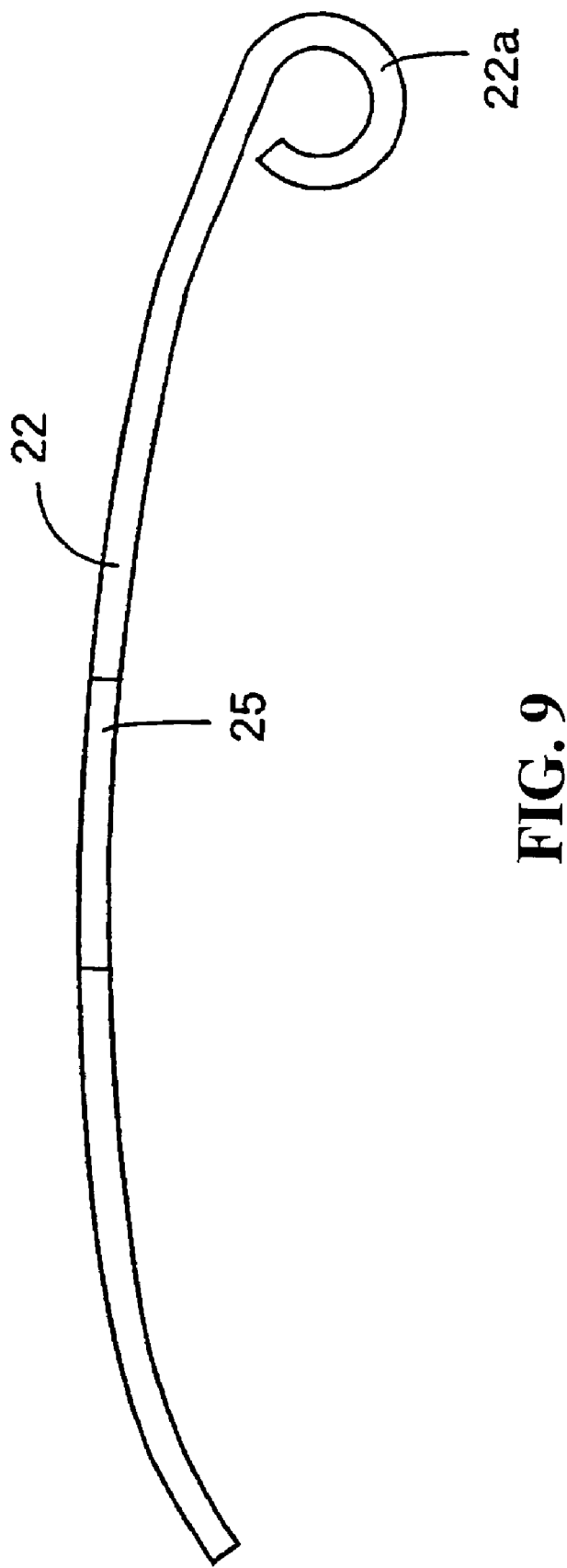
FIG. 9 is a side view showing the tensioner arm body.

As shown in FIGS. 8 and 9, an arc-shaped cut-out 25 is formed in the middle from the first pivot 20 to a point N pressed by the control arm 17 on both sides of the tensioner arm body 22. Thereby, the width in the middle of the tensioner arm body 22 is set so that it is smaller than the width at both ends of the arm body 22.

As shown in FIG. 1 again, the control arm 17 is made of a spring steel plate like the tensioner arm body 22 and is supported in the vicinity of the first driven sprocket 12 via a second pivot 21 by the cylinder head 3 so that the control arm can be oscillated with the oscillated end being engaged with the back on the side of the oscillated end of the tensioner arm body 22. A pressure plate 27 is bonded to the back in the middle of the control arm 17 via a cushion material 26 such as rubber and the tensioner lifter 18 for pressing the pressure plate 27 on the side of the tensioner arm 16 is attached to the cylinder head 3.

A point P of the application of the pressure of the tensioner lifter 18 upon the control arm 17 is set in the middle of the center O of the second pivot 21 which is the center of the oscillation of the control arm 17 and the pressure point N of the control arm 17 upon the tensioner arm 16.

The control arm 17 is provided with an auxiliary shoe 28 made of synthetic resin and slidingly engaged with the outside of the transmission chain 14 between the first driven sprocket 12 and the end of the tensioner arm 16.

The tensioner lifter 18 is composed of a lifter case 29 fixed to the cylinder head 3, a hollow lifter rod 30 is supported by the lifter case 29 so that the rod cannot be turned and is opposite to the pressure plate 2. A screw shaft 31 is screwed to a hollow part of the lifter rod 30 and a twisted coil spring 32, for turning and pressing the screw shaft 31 in a traveling direction of the lifter rod 30, is provided in the lifter case 29 as is heretofore well-known. Therefore, the torsional moment of the twisted coil spring 32 is converted to a thrust load by the screw shaft 31 and is amplified to be pressure that presses the lifter rod 30 on the side of the control arm 17.

Next, the action of the embodiment will be described.

While the timing transmission gear 10 is operated, that is, when the driving sprocket 11 drives the first and second driven sprockets 12, 13 via the transmission chain 14, the engaged state of each sprocket 11 to 13 of the transmission chain 14 is always kept suitable and efficient chain transmission is achieved by transmitting pressure which the tensioner lifter 18 applies to the pressure plate 27 of the control arm 17 by the lifter rod 30 to the tensioner arm 16 via the control arm 17, transmitting it to the loose side of the transmission chain 14 and applying fixed tension to the transmission chain 14.

The oscillation caused during transmission of the transmission chain 14 is effectively absorbed by the suitable deflection of the flexible tensioner arm 16. In addition, as the control arm 17 is inserted between the tensioner arm 16 and the tensioner lifter 18, the repulsion of the transmission chain 14 for the tensioner arm 16 is transmitted to the tensioner lifter 18 after the repulsion is buffered by the suitable deflection of the control arm 17 and a load of the tensioner lifter 18 is reduced. Therefore, the follow-up of the tensioner lifter 18 for the transmission chain 14 can be satisfactorily performed securing the desired useful life of the tensioner lifter 18.

In addition, as the point P of the application of the pressure of the tensioner lifter 18 upon the control arm 17 is set in the middle of the center O of the oscillation of the control arm 17 and the point N at which the control arm 17 presses the tensioner arm 16, the tensioner arm 16 can be greatly moved via the control arm 17 at a relatively small stroke of the lifter rod 30 of the tensioner lifter 18 owing to the arm ratio of the control arm 17. As a result, the follow-up of the tensioner lifter 18 for the transmission chain 14 is enhanced. Not only the repulsion of the transmission chain 14 is not directly transmitted to the tensioner lifter 18 but the useful life of the tensioner lifter 18 can be extended.

Further, as the control arm 17 presses the auxiliary shoe 28 upon the outside of the transmission chain 14 between the first driven sprocket 12 and the tensioner arm 16 by the pressure of the tensioner lifter 18, the contact ratio between the transmission chain 14 and the first driven sprocket 12 is enhanced and the control arm contributes to the enhancement of chain transmission efficiency.

As the tensioner arm 16 is composed of the tensioner arm body 22 made of a spring steel plate and the flexible tensioner shoe 23 made of synthetic resin that covers the front of the tensioner arm body 22 and is directly slidingly engaged with the transmission chain 14 and the arc-shaped cut-out 25 the width of which is smaller than the width of each end is provided on both sides of the middle of the tensioner arm body 22, the flexibility in the middle of the tensioner arm body 22 is enhanced, the oscillation absorption function for the transmission chain 14 can be enhanced, the natural frequency of the tensioner arm body 22 is different in each part because the width of the tensioner arm body 22 is different in each part and the tensioner arm can also contribute to the prevention of the resonance of the tensioner arm body 22.

In addition, as the width of the chain guide groove 23b of the tensioner shoe 23 to which the transmission chain 14 is fitted is fixed overall through surface pressure between the tensioner arm body 22 and the tensioner shoe 23 is large in a location in which the width of the tensioner arm body 22 is small, surface pressure between the tensioner shoe 23 and the transmission chain 14 is not particularly large, the wear resistance of the tensioner shoe 23 is not damaged and the durability of the tensioner arm 17 can be secured.

Further, desired flexibility can be simply applied to the middle of the tensioner arm body 22 by selecting the depth and the number of the cut-outs 25.

Figure 10:
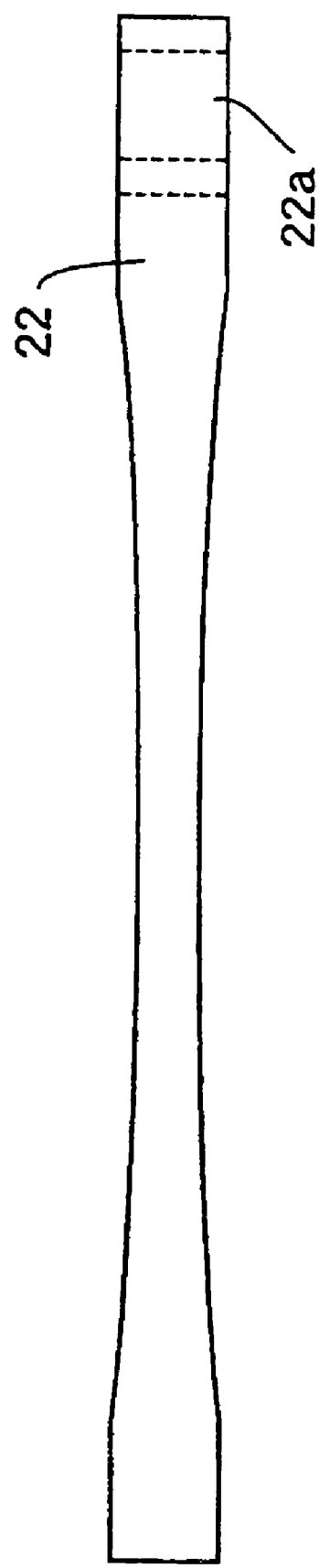
FIG. 10 shows another embodiment of the invention and corresponds to FIG. 8.

Another embodiment shown in FIG. 10 of the present invention includes the width of a tensioner arm body 22 that is gradually reduced from both ends of the arm body 22 toward the center. The configuration of the other embodiments is similar to that in the above-mentioned embodiment. Thus, the same reference numbers are allocated to a part corresponding to that in the previous embodiment in FIG. 10 and the description is omitted. In this embodiment, the similar action and effect to those in the previous embodiment can be also achieved.

The invention is not limited to the above-mentioned embodiments and various design changes are possible in a range which does not deviate from the object of the present invention. For example, in reverse to the above-mentioned embodiments, the first pivot 20 for supporting the tensioner arm 16 may be also arranged on the side of the first driven sprocket 12 and the second pivot 21 for supporting the control arm 17 may be also arranged on the side of the driving sprocket 11.

As described above, according to the first embodiment of the present invention, in the chain tensioner provided with the tensioner arm rockably supported by fixed structure and slidably engaged with the outside on the loose side of the transmission chain without an end coupling the driving sprocket and the driven sprocket and the tensioner lifter supported by the fixed structure for pressing the tensioner arm on the side of the transmission chain, as the control arm rockably supported by the fixed structure for transmitting the pressure of the tensioner lifter to the tensioner arm is inserted between the tensioner arm and the tensioner lifter, the oscillation of the transmission chain can be absorbed by applying suitable flexibility to the tensioner arm. In addition, as the control arm is inserted between the tensioner arm and the tensioner lifter, the repulsion of the transmission chain for the tensioner arm is transmitted to the tensioner lifter after the repulsion is buffered by the suitable deflection of the control arm and a load of the tensioner lifter can be reduced. Therefore, the follow-up of the tensioner lifter for the transmission chain can be satisfactorily performed, securing the desired useful life of the tensioner lifter.

In addition, according to the second embodiment of the present invention, as the point of the application of the pressure of the tensioner lifter upon the control arm is set to the middle of the center of the oscillation of the control arm and the point at which the control arm presses the tensioner arm, the tensioner arm can be greatly moved via the control arm at a relatively small stroke of the lifter rod of the tensioner lifter owing to the arm ratio of the control arm, as a result, the follow-up of the tensioner lifter for the transmission chain is further enhanced, and the repulsion of the transmission chain is not directly transmitted to the tensioner lifter but the useful life of the tensioner lifter can be extended.

Further, according to the third embodiment of the present invention, as the pressing part for slidably pressing the outside of the transmission chain is provided to the control arm between the end of the tensioner arm and the sprocket in the vicinity of the end, the contact ratio of the transmission chain and the driving or driven sprocket close to the end of the tensioner arm is enhanced and chain transmission efficiency can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain tensioner provided with a tensioner arm rockably supported by a fixed structure and slidably engaged with an outside on a loose side of an endless transmission chain that couples a driving sprocket and a driven sprocket,
   wherein a tensioner lifter is supported by the fixed structure for pressing the tensioner arm upon the side of the transmission chain,
   wherein a control arm rockably is supported by the fixed structure for transmitting pressure from the tensioner lifter to the tensioner arm, said control arm being inserted between the tensioner lifter and a portion of the tensioner arm, and
   the tensioner lifter being disposed substantially closer to a pivot point of the control arm than to a pivot point of the tensioner arm.

2. The chain tensioner according to claim 1, wherein a point of an application of the pressure of the tensioner lifter upon the control arm is set to substantial a middle of the center of the oscillation of the control arm and a point at which the control arm presses the tensioner arm.

3. The chain tensioner according to claim 2, wherein the control arm is substantially shorter in length than the tensioner arm.

4. The chain tensioner according to claim 1, wherein a pressing part slidably engaged with the outside of the transmission chain is provided on a portion of the control arm disposed between the end of the tensioner arm and the sprocket.

5. The chain tensioner according to claim 1, wherein said control arm includes a proximal end and a distal end and said tensioner arm includes a proximal end and a distal end, said proximal end of said tensioner arm being pivotably mounted relative to said fixed structure and said proximal end of said control arm being pivotably mounted relative to said fixed structure at a point displaced relative to the pivotable mounting of said tensioner arm.

6. The chain tensioner according to claim 5, wherein said distal end of said control arm engages the tensioner arm at a point displaced a predetermined distance from the distal end of the tensioner arm towards the proximal end of the tensioner arm.

7. The chain tensioner according to claim 1, wherein said control arm includes a proximal end and a distal end, said proximal end of said control arm being pivotably mounted relative to said fixed structure, said distal end of said control arm being in engagement with said tensioner arm and an engaging portion of said control arm disposed between said proximal end and said distal end being operatively engaged with said tensioner lifter for applying a force to said tensioner arm.

8. The chain tensioner according to claim 7, and further including an auxiliary shoe mounted on said control arm and being in direct engagement with said transmission chain.

9. The chain tensioner according to claim 8, wherein said auxiliary shoe is constructed of a synthetic resin material.

10. The chain tensioner according to claim 7, and further including a pressure plate and a cushion material mounted on said engaging portion of said control arm for engagement with said tensioner lifter.

11. The tensioner according to claim 1, wherein the control arm is curved toward the tensioner arm, and the distal end of the tensioner arm is disposed at a curved portion of the control arm.

12. A tensioner comprising:
a tensioner arm;
a transmission member operatively coupled between a driving sprocket and a driven sprocket, said tensioner arm being in engagement with a loose side of said transmission member;
a tensioner lifter for pressing the tensioner arm into engagement with the loose side of the transmission member; and
a control arm movably mounted relative to said tensioner arm for transmitting pressure from the tensioner lifter to the tensioner arm, said control arm being inserted between the tensioner arm and the tensioner lifter,
wherein the control arm is shaped differently from the tensioner arm, the control arm being shaped for transmitting the pressure from the tensioner lifter to the tensioner arm at a specific pressure point N of the control arm,
the control arm not contacting the tensioner arm directly under point P where the tensioner lifter applies the pressure to the control arm.

13. The tensioner according to claim 12, wherein a point of an application of the pressure of the tensioner lifter upon the control arm is set to substantially a middle of the center of the oscillation of the control arm and a point at which the control arm presses the tensioner arm.

14. The tensioner according to claim 13, wherein a pressing part directly contacting the outside of the transmission member is provided on a portion of the control arm disposed between the end of the tensioner arm and the sprocket.

15. The tensioner according to claim 12, wherein a pressing part slidably engaged with the outside of the transmission member is provided on a portion of the control arm disposed between the end of the tensioner arm and the sprocket.

16. The tensioner according to claim 12, wherein said control arm includes a proximal end and a distal end and said tensioner arm includes a proximal end and a distal end, said proximal end of said tensioner arm being pivotably mounted relative to a fixed structure and said proximal end of said control arm being pivotably mounted relative to said fixed structure at a point displaced relative to the pivotable mounting of said tensioner arm.

17. The tensioner according to claim 16, wherein said distal end of said control arm engages the tensioner arm at a point displaced a predetermined distance from the distal end of the tensioner arm towards the proximal end of the tensioner arm.

18. The tensioner according to claim 12, wherein said control arm includes a proximal end and a distal end, said proximal end of said control arm being pivotably mounted relative to a fixed structure, said distal end of said control arm being in engagement with said tensioner arm and an engaging portion of said control arm disposed between said proximal end and said distal end being operatively engaged with said tensioner lifter for applying a force to said tensioner arm.

19. The tensioner according to claim 18, and further including an auxiliary shoe mounted on said control arm and being in direct engagement with said transmission member.

20. The tensioner according to claim 19, wherein said auxiliary shoe is constructed of a synthetic resin material.

21. The tensioner according to claim 18, and further including a pressure plate and a cushion material mounted on said engaging portion of said control arm for engagement with said tensioner lifter.

22. The tensioner according to claim 12, wherein the control arm is curved toward the tensioner arm, and the distal end of the tensioner arm is disposed at a curved portion of the control arm.

* * * * *